United States Patent [19]
Kohlhammer et al.

[11] Patent Number: 5,605,972
[45] Date of Patent: Feb. 25, 1997

[54] GRAFT AND CORE-SHELL COPOLYMERS HAVING IMPROVED PHASE BONDING BETWEEN GRAFT SUBSTRATE AND GRAFTED-ON POLYMER PHASE

[75] Inventors: Klaus Kohlhammer, Marktl; Walter Dobler, Tann, both of Germany

[73] Assignee: Wacker-Chemie GmbH, Munich, Germany

[21] Appl. No.: 492,101

[22] PCT Filed: Jan. 27, 1994

[86] PCT No.: PCT/EP94/00230

§ 371 Date: Jul. 24, 1995

§ 102(e) Date: Jul. 24, 1995

[87] PCT Pub. No.: WO94/17114

PCT Pub. Date: Aug. 4, 1994

[30] Foreign Application Priority Data

Jan. 29, 1993 [DE] Germany ............... 43 02 552.8

[51] Int. Cl.⁶ .................. C08F 265/04; C08F 267/06; C08F 259/02; C08F 279/00
[52] U.S. Cl. ............. 525/308; 525/263; 525/301; 525/302; 525/309; 525/310; 525/316; 525/317; 528/300; 528/301
[58] Field of Search .................. 525/263, 301, 525/302, 308, 309, 310, 316, 317; 528/301, 300

[56] References Cited

U.S. PATENT DOCUMENTS

| | | | |
|---|---|---|---|
| 4,839,423 | 6/1989 | Moriya et al. | 525/263 |
| 4,839,432 | 6/1989 | Moriya et al. | 525/303 |
| 4,877,841 | 10/1989 | Moriya et al. | 525/263 |
| 4,879,347 | 11/1989 | Moriya et al. | 525/263 |
| 4,923,956 | 5/1990 | Moriya et al. | 525/263 |
| 4,927,890 | 5/1990 | Hsive et al. | 525/309 |
| 5,206,298 | 4/1993 | Kawapuchi | 525/263 |
| 5,258,465 | 11/1993 | Suyama et al. | 525/263 |
| 5,399,621 | 3/1995 | Kohlhammer | 525/263 |
| 5,475,072 | 12/1995 | Sanchez et al. | 525/263 |

FOREIGN PATENT DOCUMENTS

| | | |
|---|---|---|
| 0277608 | 8/1988 | European Pat. Off. . |
| 0279430 | 8/1988 | European Pat. Off. . |
| 0307802 | 3/1989 | European Pat. Off. . |
| 0225091 | 6/1989 | European Pat. Off. . |
| 2726008 | 12/1977 | Germany . |
| 3420048 | 1/1991 | Germany . |
| 0238811 | 10/1986 | Japan ................. 525/301 |
| 2026503 | 2/1980 | United Kingdom ........ 525/263 |

OTHER PUBLICATIONS

W. C. Endstra, Kautschuk+Gummi, Kunststoffe 42, May 1989, p. 414.
I. Gupta et al., Journal of Polymer Science: Polymer Chemistry Edition, vol. 20, 147–157 (1982).
Yamamoto et al., Polymer, 1991, vol. 32, No. 1, pp. 19–28.
F. D. Green et al., J. Org. Chem. 28, 2168–2171, vol. 28, (1963).

*Primary Examiner*—Peter A. Szekely
*Attorney, Agent, or Firm*—Burgess, Ryan and Wayne

[57] ABSTRACT

Graft and core-shell copolymers are provided which are useful as binders and are prepared from a peroxy-containing copolymer phase a) wherein the copolymer phase contains 0.01 to 20% by weight of residues of an olefinically di-unsaturated peroxy compound and from 80 to 99.99% by weight of residues of at least one comonomer and a polymer phase b) grafted thereon which is obtained by grafting one or more monomers. A process for preparing the copolymers is also provided.

17 Claims, No Drawings

GRAFT AND CORE-SHELL COPOLYMERS HAVING IMPROVED PHASE BONDING BETWEEN GRAFT SUBSTRATE AND GRAFTED-ON POLYMER PHASE

The invention relates to graft and core-shell copolymers having improved phase bonding between graft substrate and grafted-on polymer phase, peroxy-group-containing copolymers forming the basis, therefor and also processes for preparing said polymers.

Copolymerizable initiators offer interesting possibilities in the preparation of new polymer materials. They introduce potential free-radical functions into polymer chains, the so-called "macroinitiators", which function as defined anchor groups in the preparation of graft and block copolymers. One field of application is, for example, the phase coupling of incompatible polymers in core-shell latices in their preparation by the emulsion polymerization process.

Starting out from a macroinitiator, further monomers are free-radical-polymerized in grafting reactions, which monomers should be firmly anchored to the polymer backbone of the graft substrate as a result of the peroxide groups polymerized into the macroinitiator. All macroinitiators which are hitherto known in literature suffer from the disadvantage that a part of all the free radicals formed in the thermolysis of peroxide functions is not covalently bonded to the polymer backbone. This usually results in there remaining a significant amount of ungrafted polymer chains without strong bonding to the graft substrate.

Peroxycarbonates having an allylic double bond and their use as comonomer in copolymerization with further ethylenically unsaturated monomers are described in DE-A 27 26 008. DE-C 34 20 048 relates to copolymers of vinyl acetate and allyl peroxycarbonates and their use as a size for glass fibers. A disadvantage is that these allyl-functional peroxycarbonates copolymerize only very reluctantly, if at all, with other vinyl monomers.

EP-A 277 608 (U.S. Pat. No. 4,879,347) and EP-A 279 430 (U.S. Pat. No. 4,839,432) describe copolymerizable peroxycarbonates having (meth)acrylate and allyl ether functions as comonomers for improving the phase bonding in the preparation of polymer blends. The peroxycarbonate is here polymerized with vinyl monomers in the presence of an ethylene copolymer in the suspension polymerization process. On heating the mixture, coupling of the two polymer phases occurs via the peroxy functions. A method analogous to EP-A 279 430 is described in U.S. Pat. No. 4,923,956, the difference being that propylene polymers are used in place of the ethylene polymers. EP-A 307 802 relates to mixtures of polypropylene, a further polymer and a copolymer of vinyl monomer and a peroxycarbonate having an allyl ether or (meth)acrylate function, whose phase bonding is improved by heating to temperatures of from 200° to 300° C. EP-B 225 091 describes allyl ether-substituted peroxydicarbonates as initiators for preparing high-molecular-weight, branched VC polymers. A disadvantage of the copolymerizable peroxyesters just mentioned is, particularly in the case of the allyl compounds, their low reactivity in copolymerization with other vinyl monomers. Furthermore, the said peroxyesters can only trigger further free-radical reactions at temperatures of ≧130° C. and are thus not of interest for emulsion polymerization.

The methylstyrene-based peroxy compound discussed in W. C. Endstra, Kautschuk und Gummi, Kunststoffe 42 (5), 414 (1989) has the disadvantage that it cannot be copolymerized with many vinyl monomers and further free-radical reactions are thermally triggered only at temperatures of ≧160° C. The same applies to tert-butyl peroxy(p-vinylbenzoyl)benzoate (I. Gupta, S. N. Gupta, D. C. Neckers, J. Polym. Sci.: Polym. Chem. Ed. 20, 147 (1982)) which thermally triggers further free-radical reactions only at T≧100° C. and can thus not be used for grafting in the emulsion polymerization process.

Copolymerizible peroxide compounds based on free-radical-copolymerizable allyl compounds or fumaric acid derivatives are described by Yamamota Y. et al., Polymer 32, 19 (1991). A disadvantage of these compounds is their unsatisfactory copolymerizability with vinyl esters; furthermore, the dissociation temperatures with a half-life of 10 hours are frequently above the critical temperature for emulsion polymerization, viz. 100° C.

All the abovementioned systems have the disadvantage that in the thermal dissociation of the peroxy groups only about half of all radicals formed are covalently bonded to the main polymer chain. The remaining radicals have no bond to the polymer backbone of the macroinitiator (graft substrate) and are disadvantageous to an effective grafting reaction.

It is therefore an object of the invention to provide copolymers of ethylenically unsaturated monomers with olefinically unsaturated peroxy compounds whose peroxy groups are retained during copolymerization and, after incorporation into the copolymer, can initiate further free-radical polymerization reactions at temperatures ≦100° C. and whose dissociation results in all free radicals formed being covalently bonded to the main polymer chain. It is a further object of the invention to provide graft and core-shell copolymers based on the peroxy-group-containing copolymers.

The invention provides copolymers of one or more comonomers from the group consisting of (meth)acrylic esters of alcohols having from 1 to 10 carbon atoms, vinyl esters of saturated aliphatic carboxylic acids having from 2 to 10 carbon atoms, olefins, vinylaromatics, vinyl halides and/or vinyl ethers, with olefinically diunsaturated diacyl peroxides of the formula

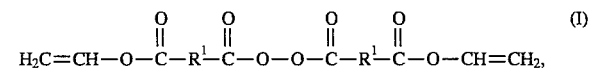

$$H_2C=CH-O-\overset{O}{\underset{\|}{C}}-R^1-\overset{O}{\underset{\|}{C}}-O-O-\overset{O}{\underset{\|}{C}}-R^1-\overset{O}{\underset{\|}{C}}-O-CH=CH_2, \quad (I)$$

where $R^1$ is a chemical bond or a linear or branched alkylene group having from 1 to 10 carbon atoms or a cycloalkylene group having from 3 to 10 carbon atoms or a divalent radical of an aromatic compound having from 6 to 14 carbon atoms.

$R^1$ is preferably a chemical bond, an alkylene radical $(CH_2)_n$ having n=1 to 8, a phenylene radical or CH=CH. Examples of preferred diacyl peroxides are bis(monovinyloxaloyl) peroxide ($R^1$=chemical bond), bis(monovinylmalonoyl) peroxide ($R^1$=$CH_2$), bis(monovinylsuccinoyl) peroxide ($R^1$=$(CH_2)_2$), bis(monovinylglutaroyl) peroxide ($R^1$=$(CH_2)_3$), bis(monovinyladipoyl) peroxide ($R^1$=$(CH_2)_4$), bis(monovinylpimeloyl) peroxide ($R^1$=$(CH_2)_5$), bis(monovinylsuberoyl) peroxide ($R^1$=$(CH_2)_6$), bis(monovinylazeloyl) peroxide ($R^1$=$(CH_2)_7$), bis(monovinylsebacoyl) peroxide ($R^1$=$(CH_2)_8$), bis(monovinylterephthaloyl) peroxide ($R^1$=phenyl ring), bis(monovinylisophthaloyl) peroxide ($R^1$=phenyl ring), bis(monovinylmaleinoyl) peroxide ($R^1$=CH=CH), bis(monovinylfumaroyl) peroxide ($R^1$=CH=CH).

Particular preference is given to olefinically diunsaturated diacyl peroxides of the formula $H_2C$=CH—O—CO—$(CH_2)_n$—CO—O—O—CO—$(CH_2)_n$—CO—O—CH=$CH_2$ having n=1 to 8.

Most preferred is bis(monovinyladipoyl) peroxide.

The preparation of the diacyl peroxides of the formula (I) can be carried out, for example, by a method similar to that of F. G. Greene and J. Kazan, J. Org. Chem. 28, 2168 (1963).

Here, the starting materials are the corresponding monovinylcarboxylic acids of the general formula HOOC—R¹—CO—O—CH=CH₂ or their derivatives such as anhydrides or esters and these are reacted with hydrogen peroxide in the presence of dicyclohexylcarbodiimide. Monovinylcarboxylic acids can be obtained, for example, by vinylation of the corresponding dicarboxylic acids with vinyl acetate.

The peroxide-group-containing copolymers contain from 0.01 to 20% by weight of the olefinically diunsaturated peroxy compound and from 80 to 99.99% by weight of one or more comonomers from the group consisting of (meth)acrylic esters of alcohols having from 1 to 10 carbon atoms, vinyl esters of saturated aliphatic carboxylic acids having from 2 to 10 carbon atoms, olefins, vinylaromatics, vinyl halides and/or vinyl ethers, with the percentages by weight in each case being based on the total weight of the copolymer. The content of peroxy compound is preferably from 0.01 to 10% by weight, particularly preferably between 0.01 and 5% by weight.

Preferred base monomers from the group consisting of methacrylic esters or acrylic esters of alcohols having from 1 to 10 carbon atoms are methyl methacrylate, methyl acrylate, ethyl methacrylate, ethyl acrylate, isopropyl methacrylate, isopropyl acrylate, tert-butyl acrylate, n-butyl acrylate and ethylhexyl acrylate; preferred monomers from the group consisting of vinyl esters of saturated aliphatic carboxylic acids having from 2 to 10 carbon atoms are vinyl acetate, 1-methylvinyl acetate, vinyl propionate, vinyl laurate and Versaticsäure® vinyl esters having from 9 to 10 carbon atoms (vinyl esters of saturated α-branched monocarboxylic acids, commercial product of Shell); preferred monomers from the group consisting of olefins are ethylene, propylene and 1,3-butadiene; the preferred monomer from the group consisting of vinyl halides is vinyl chloride and the preferred vinylaromatic is styrene.

If desired, the copolymers of the invention can additionally contain, as base monomers, up to 10% by weight, based on the copolymer, of ethylenically unsaturated, functional comonomers. Examples of such comonomers are monocarboxylic or dicarboxylic acids such as methacrylic acid, acrylic acid or fumaric acid and their amides, hydroxyfunctional monomers such as hydroxyethyl acrylate, 2-hydroxypropyl acrylate or N-methylolacrylamide, sulfonate-functional monomers such as vinylsulfonate or 2-acrylamido-2-methylpropanesulfonate and polyunsaturated monomers such as divinyl adipate.

Particular preference is given to copolymers with one or more comonomers from the group consisting of vinyl acetate, 1-methylvinyl acetate, vinyl propionate, vinyl laurate, vinyl chloride and/or ethylene and also one or more olefinically unsaturated peroxy compounds of the formula H₂C=CH—O—CO—(CH₂)ₙ—CO—O—O—CO—(CH₂)ₙ—CO—O—CH=CH₂ having n=1

Most preferred are copolymers containing from 0 to 50% by weight of ethylene, at least 50% by weight of vinyl acetate and from 0.01 to 5% by weight of bis(monovinyladipoyl) peroxide, with the percentages by weight being based on the total weight of the copolymer and adding up to 100% by weight.

The peroxide-group-containing copolymers behave as "macroinitiators" in graft copolymerization. The free peroxide groups in the copolymer function as anchor groups in graft copolymerization and thus improve the phase bonding of incompatible polymer phases, for example in core-shell latices. In the copolymerization for preparing the peroxide-containing copolymers, the reaction conditions do have to be selected in such a way that the peroxide bond is not broken.

The peroxy-group-containing copolymers are prepared by polymerization in bulk, in solution, in suspension or in emulsion. Of the processes specified, emulsion polymerization is the preferred variant. The polymerization can be carried out batchwise or continuously, with or without the use of seed latices, with initial charging of all or some constituents of the reaction mixture, or with partial initial charging and subsequent metering in of the or some of the constituents of the reaction mixture, or by the metering-in method without initial charge. All metered additions are preferably carried out at the same rate as the consumption of the respective component.

The peroxide bonds must not be destroyed during the copolymerization. Owing to their thermolability, the reaction temperatures must therefore be kept as low as possible. The polymerization is therefore initiated in a temperature range from 0° to 50° C., preferably from 0° to 40° C., since at a higher temperature appreciable dissociation of the peroxy groups in the copolymer occurs.

The polymerization reaction is preferably started by free-radical initiation. To be able to initiate at low temperatures, the initiation is carried out by the redox method. To prevent the olefinically unsaturated peroxides from reacting with the component to be reduced of the redox initiator system, the free-radical initiation is carried out using water-soluble peroxides having as high as possible, an oxidation potential, preferably in a slight molar excess to the reduction component, in particular in a molar ratio of from 1:0.9 to 1:0.8.

In the preferred emulsion polymerization, the initiation is preferably carried out by means of suitable water-soluble free-radical formers which are preferably used in amounts of from 0.01 to 3.0% by weight, based on the total weight of the monomers. Examples of such free-radical formers are ammonium and potassium persulfate and peroxodisulfate, or hydrogen peroxide. Suitable reducing agents are the systems customary in such polymerization processes, as are described in Houben-Weyl volume 14/1, pages 263–297, for example sodium formaldehydesulfoxylate, sodium sulfite, sodium hydrogensulfite, dithionite or ascorbic acid.

Dispersants which can be used are all those emulsifiers and protective colloids which are customarily used in emulsion polymerization. Preferably, from 1 to 6% by weight, based on the total weight of the monomers, of emulsifier are used. Examples of suitable dispersants are anionic surfactants such as alkyl sulfates having a chain length of from 8 to 18 carbon atoms, alkyl and alkylaryl ether sulfates having from 8 to 18 carbon atoms in the hydrophobic radical and up to 40 ethylene or propylene oxide units, alkylsulfonates or alkylarylsulfonates having from 8 to 18 carbon atoms, esters and half-esters of sulfosuccinic acid with monohydric alcohols or alkylphenols. Suitable nonionic surfactants are, for example, alkyl polyglycol ethers or alkylaryl polyglycol ethers having from 8 to 40 ethylene oxide units.

If desired, protective colloids can be used, preferably in amounts of up to 15% by weight, based on the total weight of the monomers. Examples of such protective colloids are vinyl alcohol/vinyl acetate copolymers containing from 80 to 100 mol % of vinyl alcohol units, polyvinylpyrrolidones having a molecular weight of from 5000 to 400000, hydroxyethyl celluloses having a degree of substitution of from 1.5 to 3.

The desired pH range for the polymerization, which is generally between 2.5 and 10, preferably between 3 and 8, can be set in a known manner by means of acids, bases or customary buffer salts such as alkali metal phosphates or alkali metal carbonates. The molecular weight can be adjusted in the polymerization by addition of the customarily used regulators, for example mercaptans, aldehydes and chlorinated hydrocarbons.

The peroxide-containing copolymers (macro-initiators) are suitable for triggering further free-radical chain reactions in a second reaction step by thermal initiation. Examples are the preparation of graft copolymers, in particular of core-shell dispersion particles having improved phase bonding between the polymer phases by reaction of the macroinitiators with further monomers. The peroxidic bonds in the macroinitiator are here cleaved and new polymer sections are formed.

The invention further provides Graft and core-shell copolymers prepared from a peroxy-group-containing polymer phase a) which contains from 0.01 to 20% by weight of an olefinically diunsaturated peroxy compound of the formula $H_2C=CH-O-CO-R^1-CO-O-O-CO-R^1-CO-O-CH=CH_2$, where $R^1$ is a chemical bond or a linear or branched alkylene group having from 1 to 10 carbon atoms or a cycloalkylene group having from 3 to 10 carbon atoms or a divalent radical of an aromatic compound having from 6 to 14 carbon atoms, and from 80 to 99.99% by weight of one or more comonomers from the group consisting of (meth)acrylic esters of alcohols having from 1 to 10 carbon atoms, vinyl esters of saturated aliphatic carboxylic acids having from 2 to 10 carbon atoms, olefins, vinylaromatics, vinyl halides and/or vinyl ethers, and a polymer phase b) grafted thereon, which is obtained by grafting one or more monomers from the group consisting of (meth)acrylic esters of alcohols having from 1 to 10 carbon atoms, vinyl esters of saturated aliphatic carboxylic acids having from 2 to 10 carbon atoms, olefins, vinyl halides and styrene and also styrene derivatives onto the peroxy-group-containing polymer phase a), with the graft and core-shell copolymers containing from 1 to 99% by weight of polymer phase b), based on the total weight of the graft and core-shell copolymers.

Preferred monomers of the polymer phase b) from the group consisting of (meth)acrylic esters of alcohols having from 1 to 10 carbon atoms are methyl methacrylate, methyl acrylate, ethyl methacrylate, ethyl acrylate, isopropyl methacrylate, isopropyl acrylate, t-butyl acrylate, n-butyl acrylate and ethylhexyl acrylate. Preferred vinyl esters of saturated aliphatic carboxylic acids having from 2 to 10 carbon atoms are vinyl acetate, vinyl propionate and vinyl laurate. Preferred olefins are ethylene and propylene. As vinyl halide, preference is given to using vinyl chloride. Particular preference is given to styrene and methyl methacrylate. In addition, the polymer phase b) can further contain, if desired, up to 10% by weight, based on the total weight of the polymer phase b), of the abovementioned ethylenically unsaturated, functional comonomers.

Preferred graft and core-shell copolymers are those prepared from a peroxy-group-containing polymer phase a) containing one or more comonomers from the group consisting of vinyl acetate, 1-methylvinyl acetate, vinyl propionate, vinyl laurate, vinyl chloride and/or ethylene and from 0.01 to 10% by weight of one or more olefinically diunsaturated peroxy compounds of the formula $H_2C=CH-O-CO-(CH_2)_n-CO-O-O-CO-(CH_2)_n-CO-O-CH=CH_2$ having n=1 to 8 and a grafted-on polymer phase b) containing (meth)acrylic esters of alcohols having from 1 to 10 carbon atoms, vinyl halides, styrene and/or styrene derivatives.

Particular preference is given to graft and core-shell copolymers prepared from a peroxy-group-containing polymer phase a) containing from 0 to 50% by weight of ethylene, at least 50% by weight of vinyl acetate and from 0.01 to 5% by weight of bis(monovinyladipoyl) peroxide, and a grafted-on polymer phase b) containing styrene or methyl methacrylate.

The reaction can be carried out in bulk, solution, suspension or emulsion. It is preferably carried out by the emulsion polymerization process. For the copolymerization, the peroxide-containing polymer a) is initially charged, preferably in the form of a seed latex. The monomers of the polymer phase b) can be initially charged or, for example as a preemulsion, be metered in. The amount of the monomer added is set in such a way that the finished graft product contains between 1 and 99% by weight of these monomer units.

The graft polymerization is carried out at temperatures $\geq 60°$ C. preferably $\geq 70°$ C., without further addition of initiators, since the peroxide-containing copolymers initiate the reaction as macroinitiators. Customary accelerators, such as thioglycolic acid, zinc thioglycolate, thiourea, can be added. The copolymerization can be carried out with or without addition of emulsifier. Preferably, from 0.1 to 5.0% by weight of emulsifier, based on the total weight of the copolymer, is used.

The copolymer latices are suitable for use as binders in the textile field (nonwovens), as heat-stable binders, for example for application of roofing sheets, as adhesives in plasters and renders and as binders in emulsion paints. Further workup of the copolymer latex can be carried out, for example by spray drying, roller drying or by coagulation with subsequent drying. Copolymer resins which are obtained by coagulation or spray drying are suitable as impact modifiers in plastics, as phase coupling agents in polymer blends, as low profile additives in UP resins and for use as thermoplastic elastomers.

The following examples illustrate the invention:

EXAMPLE 1

Preparation of a peroxide-group-containing copolymer containing 0.4% by weight of bis(monovinyladipoyl) peroxide:

Four solutions to be metered in were first prepared: 1. KPS solution: 6.22 g of potassium persulfate were dissolved in 154 ml of water. 2. Brüggolit solution: 1.72 g of the sodium salt of hydroxymethanesulfinic acid ("Brüggolit") were dissolved in 77 ml of water. 3. Monomers: 3.07 g of bis(monovinyladipoyl) peroxide were dissolved in 740 ml of vinyl acetate. 4. Preemulsion: 13.5 g of a 35% strength solution of a nonylphenol-ethylene oxide sulfate ("Rewopol NOS25") and 76.8 g of a 25% strength solution of an isotridecyl alcohol ethylene oxide ("Genapol® X360") were emulsified in 77 ml of water. A 2 l glass vessel fitted with stirrer and internal thermometer was charged with: 822 ml of water, 3.84 g of Rewopol NOS25, 4.39 g of Genapol® X360 and 82.6 ml of vinyl acetate. The mixture was heated to 30° C. while stirring. After reaching temperature equilibrium, metering in of the two initiator solutions (KPS and Brüggolit) was commenced and the seed latex was polymerized to completion over a period of 15 minutes. When no further exothermic reaction was able to be observed, the metering in of the monomers and the preemulsion was commenced. The metering rates were selected so as to correspond to a metering time of 5 hours in the case of the monomers (3.) and the preemulsion (4.) and of 6 hours in the case of the initiators (1.) and (2.). During the entire reaction time, care was taken to ensure that the internal temperature of 30° C. was not exceeded.

The result was a finely divided dispersion having a solids content of 39.6% by weight and a polydisperse particle size distribution, with the mean particle size being 107 nm. The glass transition temperature of the polymer resin (DSC) was +28.7° C., its K value (measured in tetrahydrofuran THF) was 67.0. The mean molecular weight (number average) of the soluble proportion was (GPC, polystyrene standards) $M_n$=31300. A film was drawn from the dispersion at room temperature. The finished film was heat treated at 150° C. for 5 minutes and boiled in refluxing ethyl acetate for 6 hours. Its insoluble proportion (degree of crosslinking) was 1.2%.

EXAMPLE 2

Preparation of a peroxide-group-containing copolymer containing 0.6% by weight of bis(monovinyladipoyl) peroxide:

Four solutions to be metered in were first prepared: 1. KPS solution: 8.13 g of potassium persulfate were dissolved in 150 ml of water. 2. Brüggolit solution: 4.26 g of the sodium salt of hydroxymethanesulfinic acid ("Brüggolit") were dissolved in 60 ml of water. 3. Monomers: 3.61 g of bis(monovinyladipoyl) peroxide were dissolved in 538 ml of vinyl acetate. 4. Preemulsion: 10.3 g of a 35% strength solution of a nonylphenolethylene oxide sulfate ("Rewopol NOS25") and 60.2 g of a 25% solution of all isotridecyl alcohol ethylene oxide ("Genapol X360") were emulsified in 77 ml of water.

The reaction procedure was fully analogous to Example 1.

The result was a finely divided dispersion having a solids content of 38.8% by weight and a polydisperse particle size distribution, with the mean particle size being 115 nm. The glass transition temperature of the polymer resin (DSC) was +23.7° C., its K value (measured in tetrahydrofuran THF) was 66.1. The mean molecular weight (number average) of the soluble proportion was (GPC, polystyrene standards) $M_n$=95000. The proportion insoluble in ethyl acetate (degree of crosslinking) was 0.2%.

EXAMPLE 3

Preparation of a peroxide-group-containing copolymer containing 0.8% by weight of bis(monovinyladipoyl) peroxide:

The procedure was exactly as in Example 1, except that in the monomer solution to be metered in, 6.15 g of bis(monovinyladipoyl) peroxide were dissolved in 737 ml of vinyl acetate.

The result was a finely divided dispersion having a solids content of 39.6% by weight and a polydisperse particle size distribution, with the mean particle size being 105 nm. The glass transition temperature of the polymer resin (DSC) was +34.2° C., its K value (measured in tetrahydrofuran THF) was 61.1. The mean molecular weight (number average) of the soluble proportion was (GPC, polystyrene standards) $M_n$=34500. The proportion insoluble in ethyl acetate (degree of crosslinking) was 2.7%.

EXAMPLE 4

Preparation of a peroxide-group-containing copolymer containing 3.0% by weight of bis(monovinyladipoyl) peroxide:

The procedure was exactly as in Example 1, except that in the monomer solution to be metered in, 23.1 g of bis(monovinyladipoyl) peroxide were dissolved in 718 ml of vinyl acetate.

The result was a finely divided dispersion having a solids content of 39.5% by weight and a polydisperse particle size distribution, with the mean particle size being 77 nm. The glass transition temperature of the polymer resin (DSC) was +32.8° C., its K value (measured in tetrahydrofuran THF) was 51.9. A molecular weight determination by means of GPC could not be carried out owing to the predominant amount of insoluble material. The proportion insoluble in ethyl acetate (degree of cross-linking) was 56.9%.

EXAMPLE 5

Graft polymerization of styrene/acrylic acid onto the macroinitiator of Example 1.

For the graft polymerization, a polymerization reactor was charged with 693 g of the peroxide-group-containing dispersion from Example 1 together with 1.70 g of a 1% strength iron(II) ammonium sulfate solution and 0.17 g of sodium nitrite, the mixture was heated to 70° C. and, while stirring, a preemulsion consisting of 66.4 g of styrene, 1.7 g of acrylic acid and 6.81 g of a 20% strength Aerosol MA solution in 34 ml of water was metered in over a period of 2.5 hours. After the end of the metered addition, the graft polymerization was completed at 80° C.

The result was a 43.4% strength polymer dispersion having a residual monomer content of 0.62% by weight and a mean particle size of 285 nm with a narrow particle size distribution. The K value of the resin was 67.3, the mean molecular weight (number average) of the soluble proportion was (GPC, polystyrene standards) $M_n$=29300, the insoluble proportion in ethyl acetate was 2.7% by weight. In the DSC the material appeared to have two phases, the glass transition temperatures were determined as $T_g$=37.0° C. and $T_g$=104.3° C.

EXAMPLE 6

Graft polymerization of styrene/acrylic acid onto the macroinitiator of Example 2.

For the graft polymerization, a polymerization reactor was charged with 928 g of the peroxide-group-containing dispersion from Example 2 together with 2.0 g of a 1% strength iron(II) ammonium sulfate solution, the mixture was heated to 70° C. and, while stirring, a preemulsion consisting of 38.0 g of styrene, 2.0 g of acrylic acid and 4.0 g of a 20% strength Aerosol MA solution in 24 ml of water was metered in over a period of 2.5 hours. After the end of the metered addition, the graft polymerization was completed at 80° C.

The result was a 39.4% strength polymer dispersion having a residual monomer content of 0.78% by weight and a mean particle size of 328 nm with a narrow particle size distribution. The K value of the resin was 69.8, the mean molecular weight (number average) of the soluble proportion was (GPC, polystyrene standards) $M_n$=117000; the proportion insoluble in ethyl acetate was 27.0% by weight. In the DSC, the material appeared to have two phases, the glass transition temperatures were determined as $T_g$=26.0° C. and $T_g$=98.5° C.

EXAMPLE 7

Graft polymerization of styrene/acrylic acid onto the macroinitiator of Example 3.

For the graft polymerization, a polymerization reactor was charged with 522 g of the peroxide-group-containing dispersion from Example 3 together with 1.72 g of a 1% strength iron(II) ammonium sulfate solution and 0.09 g of sodium nitrite, the mixture was heated to 70° C. and, while stirring, a preemulsion consisting of 134 g of styrene, 3.44 g of acrylic acid and 17.2 g of a 20% strength Aerosol MA solution in 69 ml of water was metered in over a period of 2.5 hours. After the end of the metered addition, the graft polymerization was completed at 80° C.

The result was a 42.5% strength polymer dispersion having a residual monomer content of 1.0% by weight and a mean particle size of 248 nm with a broad particle size distribution. The K value of the resin was 74.9, the mean molecular weight (number average) of the soluble proportion was (GPC, polystyrene standards) $M_n$=98800, the proportion insoluble in ethyl acetate was 22.2% by weight. In the DSC the material appeared to have two phases, the glass transition temperatures were determined as $T_g$=39.9° C. and $T_g$=104.5° C.

EXAMPLE 8

Graft polymerization of methyl methacrylate onto the macroinitiator of Example 3.

For the graft polymerization, a polymerization reactor was charged with 532 g of the peroxide-group-containing dispersion from Example 3 together with 1.76 g of a 1% strength iron(II) ammonium sulfate solution and 0.09 g of sodium nitrite, the mixture was heated to 70° C. and, while stirring, a preemulsion consisting of 141 g of methyl methacrylate and 14.1 g of a 20% strength Aerosol MA solution in 70 ml of water was metered in over a period of 2.5 hours. After the end of the metered addition, the graft polymerization was completed at 80° C.

The result was a 43.0% strength polymer dispersion having a residual monomer content of 0.1% by weight and a mean particle size of 247 nm with a narrow particle size distribution. The K value of the resin was 70.3, the mean molecular weight (number average) of the soluble proportion was (GPC, polystyrene standards) $M_n$=68100, the proportion insoluble in ethyl acetate was 15.8% by weight. The glass transition temperature was determined as $T_g$=40.4° C. (DSC).

EXAMPLE 9

Graft polymerization of styrene/acrylic acid onto the macroinitiator of Example 4.

For the graft polymerization, a polymerization reactor was charged with 523 g of the peroxide-group-containing dispersion from Example 4 together with 1.72 g of a 1% strength iron(II) ammonium sulfate solution and 0.17 g of sodium nitrite, the mixture was heated to 70° C. and, while stirring, a preemulsion consisting of 134 g of styrene, 3.44 g of acrylic acid and 17.2 g of a 20% strength Aerosol MA solution in 69 ml of water was metered in over a period of 2.5 hours. After the end of the metered addition, the graft polymerization was completed at 80° C.

The result was a 43.4% strength polymer dispersion having a residual monomer content of 0.8% by weight and a mean particle size of 234 nm with a narrow particle size distribution. The K value of the resin was 59.8, the proportion insoluble in ethyl acetate was 52% by weight. In the DSC the material appeared to have two phases, the glass transition temperatures were determined as $T_g$=37.8° C. and $T_g$=103.3° C.

EXAMPLE 10

Graft polymerization of methyl methacrylate onto the macroinitiator of Example 4.

For the graft polymerization, a polymerization reactor was charged with 534 g of the peroxide-group-containing dispersion from Example 4 together with 1.76 g of a 1% strength iron(II) ammonium sulfate solution and 0.17 g of sodium nitrite, the mixture was heated to 70° C. and, while stirring, a preemulsion consisting of 141 g of methyl methacrylate and 14.1 g of a 20% strength Aerosol MA solution in 70 ml of water was metered in over a period of 2.5 hours. After the end of the metered addition, the graft polymerization was completed at 80° C.

The result was a 43.1% strength polymer dispersion having a residual monomer content of 0.3% by weight and a mean particle size of 251 nm with a narrow particle size distribution. The K value of the resin was 66.0, the proportion insoluble in ethyl acetate was 51.3% by weight. The glass transition temperature was determined as $T_g$=43.8° C. (DSC).

COMPARATIVE EXAMPLE 1

Preparation of a homopolymer without addition of an olefinically unsaturated peroxy compound:

The procedure was exactly as in Examples 1–4, except that no copolymerizable peroxide was introduced together with the metered addition of monomer.

The result was a finely divided dispersion having a solids content of 39.4% by weight and a polydisperse particle size distribution, with the mean particle size being 113 nm. The glass transition temperature of the polymer resin (DSC) was +35.0° C., its K value (measured in tetrahydrofuran THF) was 67.0. The mean molecular weight (number average) of the soluble proportion was (GPC, polystyrene standards) $M_n$=30800. The proportion insoluble in ethyl acetate (degree of crosslinking) was 0.1%.

COMPARATIVE EXAMPLE 2

Preparation of a homopolymer without addition of an olefinically unsaturated peroxy compound:

The procedure was exactly as in Comparative Example 1.

The result was a finely divided dispersion having a solids content of 39.5% by weight and a polydisperse particle size distribution, with the mean particle size being 113 nm. The glass transition temperature of the polymer resin (DSC) was +32.6° C., its K value (measured in tetrahydrofuran THF) was 68.4. The mean molecular weight (number average) of the soluble proportion was (GPC, polystyrene standards) $M_n$=28300. The proportion insoluble in ethyl acetate (degree of crosslinking) was 0.1%.

COMPARATIVE EXAMPLE 3

Graft polymerization of styrene/acrylic acid onto the homopolymeric polyvinyl acetate dispersion of Comparative Example 1 using low-molecular-weight initiators (comparison with Example 7)

Two solutions to be metered in were first prepared: 1. KPS solution: 2.16 g of potassium persulfate were dissolved in 41 ml of water. 2. Monomers: 134 g of styrene, 3.43 g of acrylic acid and 17.1 g of a 20% strength Aerosol MA solution were emulsified in 69 ml of water.

For the graft polymerization, a 2 l glass vessel fitted with stirrer and internal thermometer was charged with: 21 ml of water, 521 g of the dispersion from Comparative Example 1 and 1.71 g of a 1% strength iron(II) ammonium sulfate solution. The mixture was heated to 80° C. while stirring. After reaching temperature equilibrium, metering in of both the initiator solution (KPS) and the preemulsion was commenced. The metering rates were selected so as to correspond to a metering-in time of 2.5 hours in the case of the preemulsion and 3 hours in the case of the initiator. After the end of the metered addition, the reaction was completed at 85° C.

The result was a 42.8% strength polymer dispersion having a residual monomer content of 0.52% by weight and a mean particle size of 394 nm with a broad particle size distribution. The K value of the resin was 64.0, the proportion insoluble in ethyl acetate was 13.1% by weight. In the DSC the material appeared to have two phases, the glass transition temperatures were determined as $T_g=35.0°$ C. and $T_g=101.3°$ C.

COMPARATIVE EXAMPLE 4

Graft polymerization of styrene/acrylic acid onto the homopolymeric polyvinyl acetate dispersion from Comparative Example 2 using low-molecular-weight initiators (comparison with Example 2):

Two solutions to be metered in were first prepared: 1. KPS solution: 2.16 g of potassium persulfate were dissolved in 41 ml of water. 2. Monomers: 140 g of methyl methacrylate and 17.5 g of a 20% strength Aerosol MA solution were emulsified in 70 ml of water.

For the graft polymerization, a 2 l glass vessel fitted with stirrer and internal thermometer was charged with: 21 ml of water, 530 g of the dispersion from Comparative Example 2 and 1.75 g of a 1% strength iron(II) ammonium sulfate solution. The mixture was heated to 80° C. while stirring. After reaching temperature equilibrium, metering in of both the initiator solution (KPS) and the preemulsion was commenced. The metering rates were selected so as to correspond to a metering time of 2.5 hours in the case of the preemulsion and 3 hours in the case of the initiator. After the end of the metered addition, the reaction was completed at 85° C.

The dispersion coagulated in the final phase of the polymerization.

COMPARATIVE EXAMPLE 5

Preparation of a homopolymeric polystyrene dispersion

A 2 l glass vessel fitted with stirrer and internal thermometer was charged with: 664 ml of water, 121 ml of a 20% strength Aerosol MA solution, 3.3 g of a 1% strength iron(II) ammonium sulfate solution, 0.3 g of potassium persulfate and 200 g of styrene. Immediately after heating the mixture to 70° C., a solution of 1.33 g of potassium persulfate in 73 ml of water was metered in over a period of 4 hours. Half an hour after the commencement of the reaction, 465 g of styrene were metered in over a period of 3.5 hours. The reaction was subsequently completed at 80° C.

The result was a 44.4% strength polymer dispersion having a polydisperse particle size distribution, with the mean particle size being about 143 nm. The K value of the resin was 67.0. The polymer resin was completely soluble in ethyl acetate. The glass transition temperature was $T_g=103.2°$ C.

The Tables 1 to 3 below summarize the most important data from the Examples and the Comparative Examples for the purpose of giving a better overview.

TABLE 1

| Preparation of the macroinitiators and the blank samples | | | | | | |
|---|---|---|---|---|---|---|
| Example | Ex. 1 | Ex. 2 | Ex. 3 | Ex. 4 | Comp. Ex. 1 | Comp. Ex. 2 |
| Vinyl acetate (parts) | 99.60 | 99.40 | 99.20 | 97.00 | 100.00 | 100.00 |
| BMAP (parts) | 0.40 | 0.60 | 0.80 | 3.00 | 0.00 | 0.00 |
| NOS25 (parts) | 0.80 | 0.80 | 0.80 | 0.80 | 0.80 | 0.80 |
| X360 (parts) | 3.00 | 3.00 | 3.00 | 3.00 | 3.00 | 3.00 |
| $K_2S_2O_8$ (parts) | 0.81 | 1.35 | 0.81 | 0.81 | 0.81 | 0.81 |
| Brüggolit (parts) | 0.42 | 0.71 | 0.42 | 0.42 | 0.42 | 0.42 |
| Solids content (wt. %) | 39.60 | 38.80 | 39.60 | 39.50 | 39.40 | 39.50 |
| Particle size (nm) | 107 | 115 | 105 | 77 | 113 | 113 |
| Glass transition temperature (°C.) | 28.7 | 23.7 | 34.2 | 32.8 | 35.0 | 32.6 |
| K value | 67.0 | 66.1 | 61.1 | 51.9 | 67.0 | 68.4 |
| $M_n$ (GPC) | 31300 | 95000 | 34500 | — | 30800 | 28300 |
| Crosslinking (% insoluble proportion) | 1.2 | 0.2 | 2.7 | 56.9 | 0.1 | 0.1 |

BMAP: bis(monovinyladipoyl) peroxide, NOS25: Rewopol NOS25 nonylphenol-ethylene oxide sulfate, X360: Genapol X360 isotridecyl alcohol-ethlene oxide

TABLE 2

| Preparation of the graft polymers | | | | | | |
|---|---|---|---|---|---|---|
| Example | Ex. 5 | Ex. 6 | Ex. 7 | Ex. 8 | Ex. 9 | Ex. 10 |
| Seed latex from Example | 1 | 2 | 3 | 3 | 4 | 4 |
| (parts) | 80 | 90 | 60 | 60 | 60 | 60 |
| Styrene (parts) | 19.50 | 9.50 | 39.00 | — | 39.00 | — |
| Acrylic acid (parts) | 0.50 | 0.50 | 1.00 | — | 1.00 | — |
| MMA (parts) | — | — | — | 40 | — | 40 |
| Aerosol MA (parts) | 0.40 | 0.20 | 1.40 | 1.40 | 1.00 | 0.80 |
| $NaNO_2$ (parts) | 0.50 | — | 0.05 | 0.05 | 0.05 | 0.05 |
| FAS (parts) | 0.005 | 0.005 | 0.005 | 0.005 | 0.005 | 0.005 |

TABLE 2-continued

| | Preparation of the graft polymers | | | | | |
|---|---|---|---|---|---|---|
| Example | Ex. 5 | Ex. 6 | Ex. 7 | Ex. 8 | Ex. 9 | Ex. 10 |
| Solids content (% by weight) | 43.40 | 39.40 | 42.50 | 43.00 | 43.40 | 43.10 |
| Residual monomer (% by weight) | 0.62 | 0.78 | 1.00 | — | 1.00 | — |
| Particle size (nm) | 285 | 328 | 248 | 247 | 234 | 251 |
| 1st glass transition temperature (°C.) | 37.0 | 26.0 | 39.9 | 40.4 | 37.8 | 43.8 |
| 2nd glass transition temperature (°C.) | 104.3 | 98.5 | 104.5 | — | 103.3 | — |
| K value | 67.3 | 69.8 | 74.9 | 70.3 | 59.8 | 66.0 |
| $M_n$ (GPC) | 29300 | 117000 | 98800 | 68100 | — | — |
| Crosslinking (%) | 2.7 | 27.0 | 22.2 | 15.8 | 52.0 | 51.3 |

MMA: methyl methacrylate, FAS: iron ammonium sulfate

TABLE 3

| Graft copolymers of the Comparative Examples | | | |
|---|---|---|---|
| Comparative Example | 3 | 4 | 5 |
| Seed latex from Comparative Example | 1 | 2 | — |
| (parts) | 60.00 | 60.00 | — |
| Styrene (parts) | 39.00 | — | 100.00 |
| Acrylic acid (parts) | 1.00 | — | — |
| MMA (parts) | — | 40.00 | — |
| Aerosol MA (parts) | 1.00 | 1.00 | 4.00 |
| Potassium persulfate (parts) | 0.63 | 0.63 | 0.25 |
| FAS (parts) | 0.005 | 0.005 | 0.005 |
| Solids content (% by weight) | 42.8 | coagulated | 44.4 |
| Residual monomer (% by weight) | 0.52 | — | 0.73 |
| Particle size (nm) | 394 | — | 143 |
| 1st glass transition temperature (°C.) | 35.0 | — | 103.2 |
| 2nd glass transition temperature (°C.) | 101.3 | — | — |
| K value | 64.0 | — | 67.0 |
| $M_n$ (GPC) | — | — | — |
| Crosslinking (%) | 13.1 | — | 0.1 |

Table 1 (Examples 1 to 4) shows that the copolymerizable acyl peroxide of the invention acts as a cross-linker: the K value, which is measured only on the soluble proportion, drops continuously with increasing BMAP content. The proportions insoluble in ethyl acetate, the degree of crosslinking, is considerable when 3% by weight of BMAP are added. In the graft products of the invention (Table 2), the mean molecular weight increases in comparison with the graft substrate (=macroinitiator) (K value or $M_n$). In Comparative Example 3 (Table 3), the K value falls in comparison with the graft substrate. Pure polystyrene (Comparative Example 5) is completely soluble in ethyl acetate and the blank sample (Comparative Example 3) is soluble to a considerably higher extent in ethyl acetate than are the graft products of the invention.

We claim:

1. A graft or core-shell copolymer prepared from a peroxy-containing copolymer phase a) which copolymer phase contains from 0.01 to 20% by weight of residues of an olefinically di-unsaturated peroxy compound of the formula $H_2C=CH-O-CO-R^1-CO-O-O-CO-R^1-CO-O-CH=CH_2$, where $R^1$ is a chemical bond or a linear or branched alkylene group having from 1 to 10 carbon atoms or a cycloalkylene group having from 3 to 10 carbon atoms or a divalent radical of an aromatic compound having from 6 to 14 carbon atoms, and from 80 to 99.99% by weight of residues of at least one comonomer selected from the group consisting of (meth)acrylic esters of alcohols having from 1 to 10 carbon atoms, vinyl esters of saturated aliphatic carboxylic acids having from 2 to 10 carbon atoms, olefins, vinylaromatics, vinyl halides and vinyl ethers, and a polymer phase b) grafted thereon, which is obtained by grafting on one or more monomers selected from the group consisting of (meth)acrylic esters of alcohols having from 1 to 10 carbon atoms, vinyl esters of saturated aliphatic carboxylic acids having from 2 to 10 carbon atoms, olefins, vinyl halides, styrene and free radical polymerizable styrene derivatives, with the graft or core-shell copolymer containing from 1 to 99% of polymer phase b), based on the total weight of the graft or core-shell copolymer.

2. The graft or core-shell copolymer as claimed in claim 1, wherein the peroxy-group containing polymer phase a) contains residues of at least one comonomer selected from the group consisting of vinyl acetate, 1-methylvinyl acetate, vinyl propionate, vinyl laurate, vinyl chloride and ethylene and from 0.01 to 10% by weight of residues of at least one olefinically diunsaturated peroxy compound of the formula $H_2C=CH-O-CO-(CH_2)_n-CO-O-O-CO-(CH_2)_n-CO-O-CH=CH_2$ wherein n is from 1 to 8.

3. The graft or core-shell copolymer as claimed in claim 1 wherein the polymer phase b) contains residues of at least one monomer selected from the group consisting of (meth)acrylic esters of alcohols having from 1 to 10 carbon atoms, vinyl halides, styrene and free radical polymerizable styrene derivatives.

4. The graft or core-shell copolymer as claimed in claim 1 wherein the peroxy-group-containing polymer phase a) contains from 0 to 50% by weight of ethylene residues, at least 50% by weight of vinyl acetate residues and from 0.01 to 5% by weight of bis(monovinyladipoyl) peroxide residues.

5. The graft or core-shell copolymer as claimed in claim 1 wherein the polymer phase b) contains residues of styrene or methyl methacrylate.

6. A process for preparing the graft or core-shell copolymer as claimed in claim 1 which comprises:

reacting the peroxide-containing polymer a) with at least one monomer of the polymer phase b) in at least one polymerization method selected from the group consisting of bulk, solution, suspension or emulsion polymerization at temperatures $\geq 60°$ C. without further addition of an initiator.

7. The process as claimed in claim 6, wherein the reaction is carried out by the emulsion polymerization method with addition of from 0.1 to 5.0% by weight of an emulsifier, based on the total weight of the copolymer.

8. A peroxy-group-containing copolymer containing residues of at least one comonomer selected from the group consisting of (meth)acrylic esters of alcohols having from 1 to 10 carbon atoms, vinyl esters of saturated aliphatic carboxylic acids having from 2 to 10 carbon atoms, olefins, vinylaromatics, vinyl halides and ethers and residues of olefinically diunsaturated diacyl peroxides of the formula

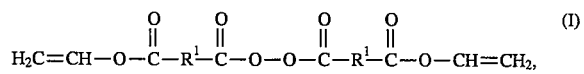   (I)

where $R^1$ is a chemical bond or a linear or branched alkylene group having from 1 to 10 carbon atoms or a cycloalkylene group having from 3 to 10 carbon atoms or a divalent group of an aromatic compound having from 6 to 14 carbon atoms.

9. The peroxy-group-containing copolymer as claimed in claim 8, wherein $R^1$ is a chemical bond, an alkylene group $(CH_2)_n$ wherein n is 1 to 8, a phenylene group or a CH=CH group.

10. A peroxy-group-containing copolymer as claimed in claim 8, wherein the residues of the olefinically diunsaturated diacyl peroxide present comprises the residues of bis(monovinyladipoyl) peroxide.

11. The peroxy-group-containing copolymer as claimed in claim 1 containing from 0 to 50% by weight of ethylene residues, at least 50% by weight of vinyl acetate residues and from 0.01 to 5% by weight of bis(monovinyladipoyl) provide residues.

12. The process for preparing a peroxy-group-containing copolymer as claimed in claim 8 which comprises carrying out the polymerization by at least one polymerization method selected from the group consisting of bulk, solution, suspension and emulsion polymerization in a temperature range from 0° to 50° C.

13. The process as claimed in claim 12, wherein the polymerization is carried out by free-radical initiation.

14. A combination comprising the copolymer as claimed in claim 1 as an aqueous binder and at least one member selected from the group consisting of textiles, paint emulsions, plasters and an adhesive.

15. A composition containing a solid graft or core-shell copolymer as claimed in claim 1 wherein the copolymer is at least one member selected from the group consisting of impact modifiers, phase coupling agents and a low profile additive.

16. The process as claimed in claim 12 wherein the polymerization is carried out in the presence of a redox initiator system.

17. A thermoplastic elastomer copolymer of claim 1.

* * * * *